(12) United States Patent
Kallio

(10) Patent No.: US 8,547,382 B2
(45) Date of Patent: Oct. 1, 2013

(54) VIDEO GRAPHICS SYSTEM AND METHOD OF PIXEL DATA COMPRESSION

(75) Inventor: Kiia K. Kallio, Inkoo (FI)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1191 days.

(21) Appl. No.: 12/129,727

(22) Filed: May 30, 2008

(65) Prior Publication Data

US 2009/0295816 A1   Dec. 3, 2009

(51) Int. Cl.
*G06F 15/00* (2006.01)
*G06T 1/00* (2006.01)
*G06T 15/00* (2011.01)

(52) U.S. Cl.
USPC ........................ 345/501; 345/522; 345/555

(58) Field of Classification Search
USPC ................. 708/207; 345/501, 522, 530, 555
See application file for complete search history.

(56) References Cited

U.S. PATENT DOCUMENTS

| | | | |
|---|---|---|---|
| 5,301,263 A * | 4/1994 | Dowdell | 345/422 |
| 6,094,200 A | 7/2000 | Olsen et al. | |
| 6,636,226 B2 | 10/2003 | Morein et al. | |
| 6,980,597 B1 * | 12/2005 | Ling | 375/240.19 |
| 7,068,272 B1 | 6/2006 | Voorhies et al. | |
| 7,091,971 B2 | 8/2006 | Morein | |
| 2005/0195187 A1 | 9/2005 | Seiler et al. | |
| 2006/0033735 A1 * | 2/2006 | Seiler et al. | 345/421 |
| 2006/0033743 A1 | 2/2006 | Morein | |

OTHER PUBLICATIONS

A. D Falkoff Algorithms for Parallel-Search Memories, Journal of the ACM vol. 9 Issue 4, Oct. 1962, pp. 488-511.*

* cited by examiner

*Primary Examiner* — Aaron M Richer
*Assistant Examiner* — Robert Craddock
(74) *Attorney, Agent, or Firm* — Guerin & Rodriguez, LLP

(57) ABSTRACT

A video graphics system, graphics processor, and method of reducing memory bandwidth consumption include logic that groups binary data of a block of pixels into bit-planes. Each bit-plane corresponds to a different bit position in the binary data of the block and includes a bit value from each pixel in the block at that corresponding bit position. An encoding, associated with the block of pixels, represents which ones of the bit-planes are constant-value bit-planes having binary data comprised of a same bit value from every pixel in the block and which of the bit-planes are mixed-value bit-planes. Logic accesses memory storing the block of pixels to process the binary data of each mixed-value bit-plane and accesses memory storing the encoding to process the binary data of each constant-value bit-plane when a processing operation is performed on the block of pixels.

21 Claims, 11 Drawing Sheets

VIDEO GRAPHICS SYSTEM AND METHOD OF PIXEL DATA COMPRESSION

FIELD OF THE INVENTION

The invention relates generally to video graphics processing. More particularly, the invention relates to a video graphics system and method for reducing memory bandwidth utilization during rendering through pixel data compression.

BACKGROUND

For displaying three-dimensional representations of objects on a display screen, video graphics systems typically partition each object into geometric primitives. Geometric primitives are elementary graphics building blocks, examples of which include points, lines, images, bitmaps, vectors, and polygons. Triangles are a commonly employed form of primitives. Each primitive is stored as a set of vertices, with each vertex having associated display parameters, including color parameters, display (or pixel) location parameters, and texture parameters. Each primitive passes through a graphics pipeline, in which a rasterizer identifies the pixels corresponding to each primitive.

Three-dimensional scenes can have numerous objects, with many of the objects having thousands of primitives; thus, the rendering process is often computationally intensive and complex. Usually, a 3-D scene has overlapping objects. Depending upon the extent of overlap, opaque objects in the foreground can occlude a portion of or all of an object in the background, causing such objects to be partially or completely invisible from the perspective of the viewer. Accordingly, an important part of the 3D rendering process is the use of depth (i.e., Z) information.

Within a video graphics system, the depth information for the pixels is stored in memory, commonly referred to as a Z buffer. A Z value is stored for each pixel in the Z buffer. The stored Z value represents the pixel presently deemed closest and visible to the viewer. As primitives are processed, pixels with a lesser Z value than the stored Z value are occluded, and are not rendered. An incoming pixel having a higher Z value than the stored Z value is considered closer to the viewer, and, therefore, is rendered. The Z value of this incoming pixel replaces the stored Z value.

Because of the numerous primitives involved in a 3-D scene, the rendering process can require numerous read and write accesses to the Z buffer in order to perform Z value comparisons and replacements. A large number of memory accesses can limit the performance of the rendering process, particularly in video graphics systems in which memory bandwidth is at a premium, such as in handheld devices like personal digital assistants and mobile phones. Reducing the number of accesses to memory can be particularly beneficial to rendering performance in such systems.

SUMMARY

In one aspect, the invention features a graphics processor comprising logic that groups binary data of a block of pixels into a plurality of bit-planes. Each bit-plane corresponds to a different bit position in the binary data of the block of pixels and includes a bit value from each pixel in the block at that corresponding bit position. An encoding associated with the block of pixels represents which one or more of the bit-planes is a constant-value bit-plane having binary data comprised of a same bit value from every pixel in the block and which one or more of the bit-planes is a mixed-value bit-plane. Logic accesses memory storing the block of pixels to process the binary data of each mixed-value bit-plane and accesses memory storing the encoding to process the binary data of each constant-value bit-plane when a processing operation is performed on the block of pixels.

In another aspect, the invention features a method of reducing bandwidth consumption when processing pixel data. Binary data of a block of pixels are grouped into a plurality of bit-planes. Each bit-plane corresponds to a different bit position in the binary data of the block of pixels and includes a bit value from each pixel in the block at that corresponding bit position. An encoding is associated with the block of pixels and represents which one or more of the bit-planes is a constant-value bit-plane having binary data comprised of a same bit value from every pixel in the block and which one or more of the bit-planes is a mixed-value bit-plane. Memory storing the block of pixels is accessed to process the binary data of each mixed-value bit-plane and memory storing the encoding is accessed to process the binary data of each constant-value bit-plane when a processing operation is performed on the block of pixels.

In still another aspect, the invention features a video graphics system comprising a graphics processor. The graphics processor includes logic that groups binary data of a block of pixels into a plurality of bit-planes. Each bit-plane corresponds to a different bit position in the binary data of the block of pixels and includes a bit value from each pixel in the block at that corresponding bit position. An encoding associated with the block of pixels represents which one or more of the bit-planes is a constant-value bit-plane having binary data comprised of a same bit value from every pixel in the block and which one or more of the bit-planes is a mixed-value bit-plane. Logic accesses memory storing the block of pixels to process the binary data of each mixed-value bit-plane and accesses memory storing the encoding to process the binary data of each constant-value bit-plane when a processing operation is performed on the block of pixels.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
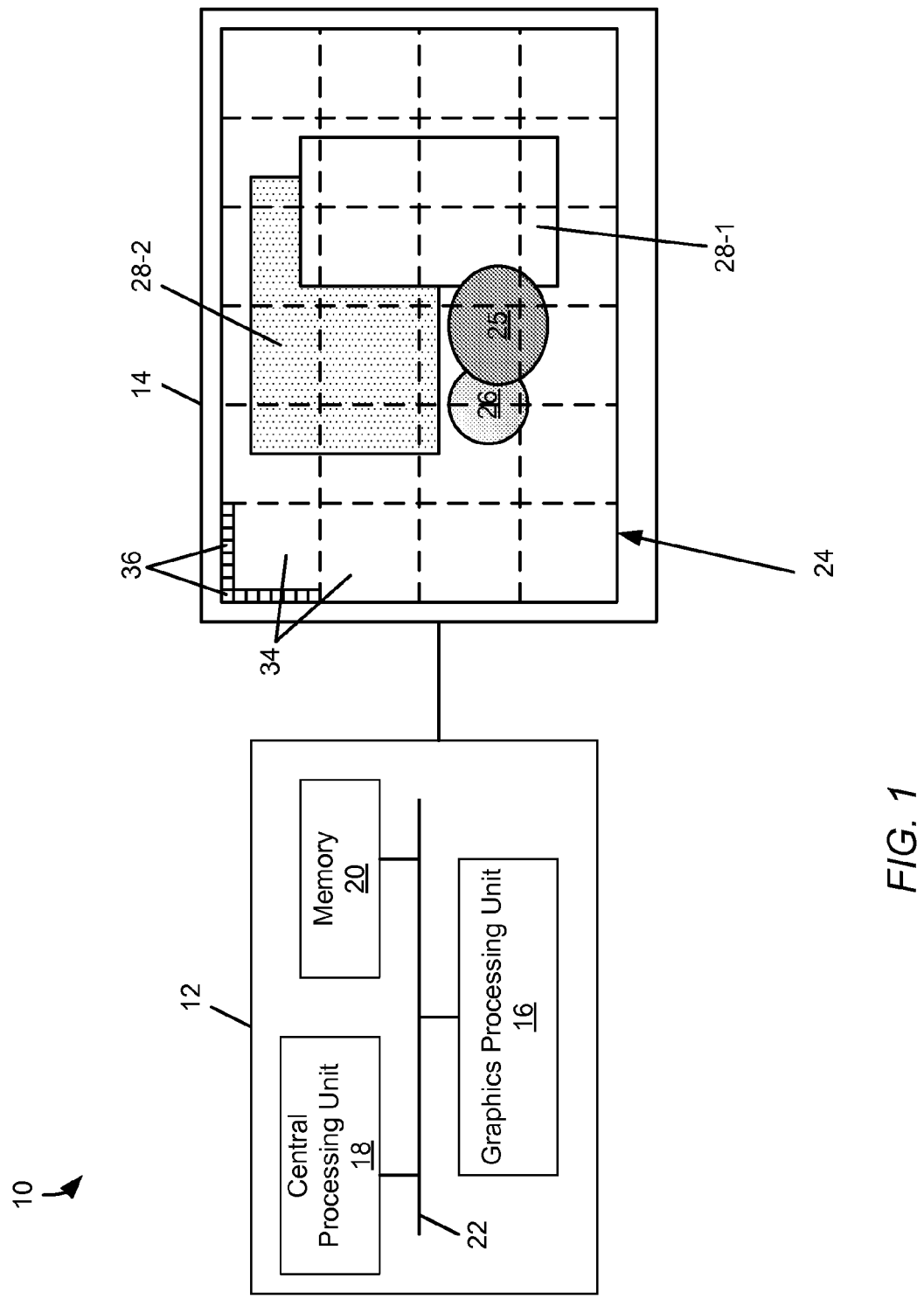
FIG. 1 is an embodiment of a video graphics system constructed in accordance with the invention, the video graphics system including a graphics-processing unit and a display screen.

Video graphics systems embodying the present invention include a graphics-processing unit capable of improving three-dimensional rendering performance by reducing the consumption of memory bandwidth during reads and writes of one or more of its memory buffers. Examples of such buffers that can appreciate memory bandwidth gains from the present invention include, but are not limited to, a Z buffer, a stencil buffer, a color buffer, and a texture buffer. The amount of bandwidth gain may vary from one type of buffer to the next, depending upon whether the data values stored in a given buffer have regional similarity. For example, video graphics systems can particularly benefit from the present invention when practiced with a Z buffer because Z-values typically do not vary significantly between neighboring pixels. The bandwidth gains are particularly beneficial in mobile computing applications (e.g., mobile phones and personal digital assistants) that have low memory bandwidth capabilities.

Referring to a Z buffer for purposes of illustrating the principles of the invention, a graphics-processing unit (GPU) can partition a Z buffer into blocks (e.g., 4×4 pixels). Although described herein with reference to pixels, the principles of the invention extend also to samples (i.e., sub-pixels) of pixels. Each pixel has an associated Z-value that is stored within the Z buffer. The Z-value of a pixel represents the depth of that pixel (or sample) from a viewer. Video graphics systems represent these Z-values as binary data (e.g., 8-bit, 16-bit, 32-bit values).

Each block of pixels and their Z-values can be represented as a plurality of bit-planes. A bit-plane represents a grouping of bits with the same bit significance (i.e., bit position) of the various Z-values in a block of pixels. For example, a 4×4 tile has 16 pixels, with each of the 16 pixels having an associated Z-value. Grouping the most significant bit of the Z-value of each pixel produces a bit-plane comprised of 16 bits. The grouping comprised of the least significant bit of the Z-value of each pixel corresponds to another bit-plane, as does the second most significant bit of the Z-value of each pixel, the third most significant bit, etc.

Often, the Z-values of a localized region of pixels have the same or approximate Z-values (i.e., they are either on or off because, for example, a primitive covering a localized region of pixels has become the closest object to the viewer). The similarity of depth often leads to a similarity of Z-values. Consequently, all bit values for a given bit-plane may be on (bit value "1") or off (bit value "0"), especially those bit-planes corresponding to the most significant bits of the Z-values. As described in more detail below, the present invention takes advantage of this similarity of bit values for the most significant bits, in order to reduce memory bandwidth usage when accessing the Z buffer (used herein as a representative example of types of buffers).

In one embodiment, each block of pixels is associated with two masks (considered separately for purposes of description, but which may be implemented as a single mask). A first mask, referred to hereafter as an indicator mask, indicates whether a particular bit-plane contains all zero values or all one values—that is, whether each pixel within the block has a Z-value that contributes the same bit value for a particular bit position. Bit-planes that contain all zero values or all one values are referred to herein as constant-value bit-planes. Conversely, the indicator mask can also signify which bit-planes do not have constant values (referred to as mixed-value bit-planes). The second mask, referred to hereafter as a value mask, provides the particular value for each constant-value bit-plane. The particular value for each constant-value bit-plane can be either one or zero.

The indicator mask and value mask enable reconstruction of the bit-plane values of the constant-value bit-planes. The graphics-processing unit accesses these masks in conjunction with writing and reading a block of pixels to and from the Z buffer (and/or to and from cache). From the masks, the graphics-processing unit is able to obtain the data associated with those constant-value bit-planes. Obtaining such data from the masks reduces the amount of remaining data (of the block) that the graphics-processing unit needs to read from or write to the Z buffer.

From these masks, the graphics-processing unit can derive a range of Z-values for a corresponding Z buffer block (or Z block). The range can be used to test an incoming tile, early in the rasterization process, to determine if all pixels of that incoming tile are visible or occluded. The masks also provide a mechanism for achieving a fast clear operation that achieves the equivalent to setting all Z-values in the Z buffer to the same value, without ever accessing the Z buffer.

In another embodiment, the graphics-processing unit identifies the lowest Z-value of a block of pixels and subtracts this Z-value from every Z-value in the block before translating the block into bit-planes. In addition, the graphics-processing unit determines the range of Z-values. This range provides an indication of which bit-planes in the post-subtraction block are constant-value bit-planes (and the bit-plane values of such bit-planes) and which are mixed-value bit-planes. In addition, this embodiment stores the lowest Z-value and Z-value range, instead of indicator and value masks, for purposes of early Z testing.

FIG. 1 shows a basic example of a video graphics system 10 in which the invention may be embodied. The video graphics system 10 includes a computing system 12 in communication with a display screen 14. The computing system 12 includes a graphics-processing unit 16, a central processing unit (CPU) 18, and memory 20, each connected to a system bus 22. Various examples of computing systems within which the present invention may be embodied include, but are not limited to, personal computers, workstations, laptop computers, server systems, hand-held devices (e.g., mobile phones and personal digital assistants), and game consoles. Although not shown, the video graphics system 10 may be connected—wired or wireless—to a network (e.g., local area network, wide area network, metropolitan area network, etc.).

The memory 20 includes non-volatile computer storage media, such as read-only memory, and volatile computer storage media, such as random-access memory (RAM).

Within the RAM are program code and data (i.e., graphics information). Program code includes, but is not limited to, application programs, a graphics library, and an operating system (e.g., Symbian OS, Palm OS, Windows Mobile, Windows 95™, Windows 98™, Windows NT 4.0, Windows XP™, Windows 2000™, Vista™, Linux™, SunOS™, and MAC OS™). Examples of application programs include, but are not limited to, standalone and networked video games, simulation programs, word processing programs, and spreadsheet programs.

The display screen 14 can be any device suitable for displaying computer-graphics generated images. Examples of display screens include, but are not limited to, computer monitors, television monitors, plasma screens, liquid crystal displays (LCD), and cathode ray tube displays. In the example shown, a three-dimensional image 24 comprised of a spherical objects 25, 26 and planar objects 28-1, 28-2 (generally, 28) appears on the display screen 14. Accordingly, the image 24 is an example of a three-dimensional display in which portions of some objects are not visible because of an opaque object in its foreground. As an example, the sphere 25 is in the foreground and occludes a portion of the sphere 26 and of the rectangle 28-1. Similarly, a portion of the rectangle 28-1 occludes a portion of the background rectangle 28-2.

The display screen 14 is partitioned into a plurality of regions or tiles 34. Each tile 34 corresponds to a matrix of display pixels 36. To increase computing efficiency, certain graphics computations can operate on tiles rather than on individual pixels. In the example shown, each tile 34 is an 8×8 matrix of pixels. Tiles 34 can have other sizes (e.g., 4×4, 4×8, and 8×4) without departing from the principles of the invention.

In brief overview, the graphics-processing unit 16 receives graphics commands from the CPU 18 and graphics information from the memory 20. The graphics-processing unit 16 can be embodied in an application-specific integrated circuit (ASIC) chip or chipset. Based on the received commands and graphics information, the graphics-processing unit 16 generates the image 24 that appears on the display screen 14. Devices other than the memory 20 can operate as input sources of graphics information. The present invention improves the performance of three-dimensional rendering by reducing the amount of memory bandwidth taken when reading from and writing pixel data to one or more of the various buffers of the graphics processor 16 (e.g., color buffer, texture buffer, or Z buffer).

The system architecture shown in FIG. 1 illustrates one example of a configuration that can be implemented to practice the invention (i.e., one in which the GPU 16 and CPU 18 share the same memory 20). In another embodiment (not shown), the GPU 16 and CPU 18 have separate memories. In addition, other configurations can be employed. For example, another configuration includes an application processor that is a separate chip (ASIC component) having a CPU, a GPU, multimedia blocks (audio, video), and memory, and a second separate chip that comprises a main CPU with its own memory.

In mobile applications, any one of these three configurations may be employed. The GPU can be implemented in a mobile baseband chip in which the GPU shares the same memory the CPU. Alternatively, the GPU can reside on a media processor, in which the GPU has its own memory. As a third alternative, the GPU can be implemented in an application processor, accompanied by another CPU that, for example, performs some tasks of the driver (the application performing the 3D rendering can still execute run on the baseband CPU).

Figure 2:
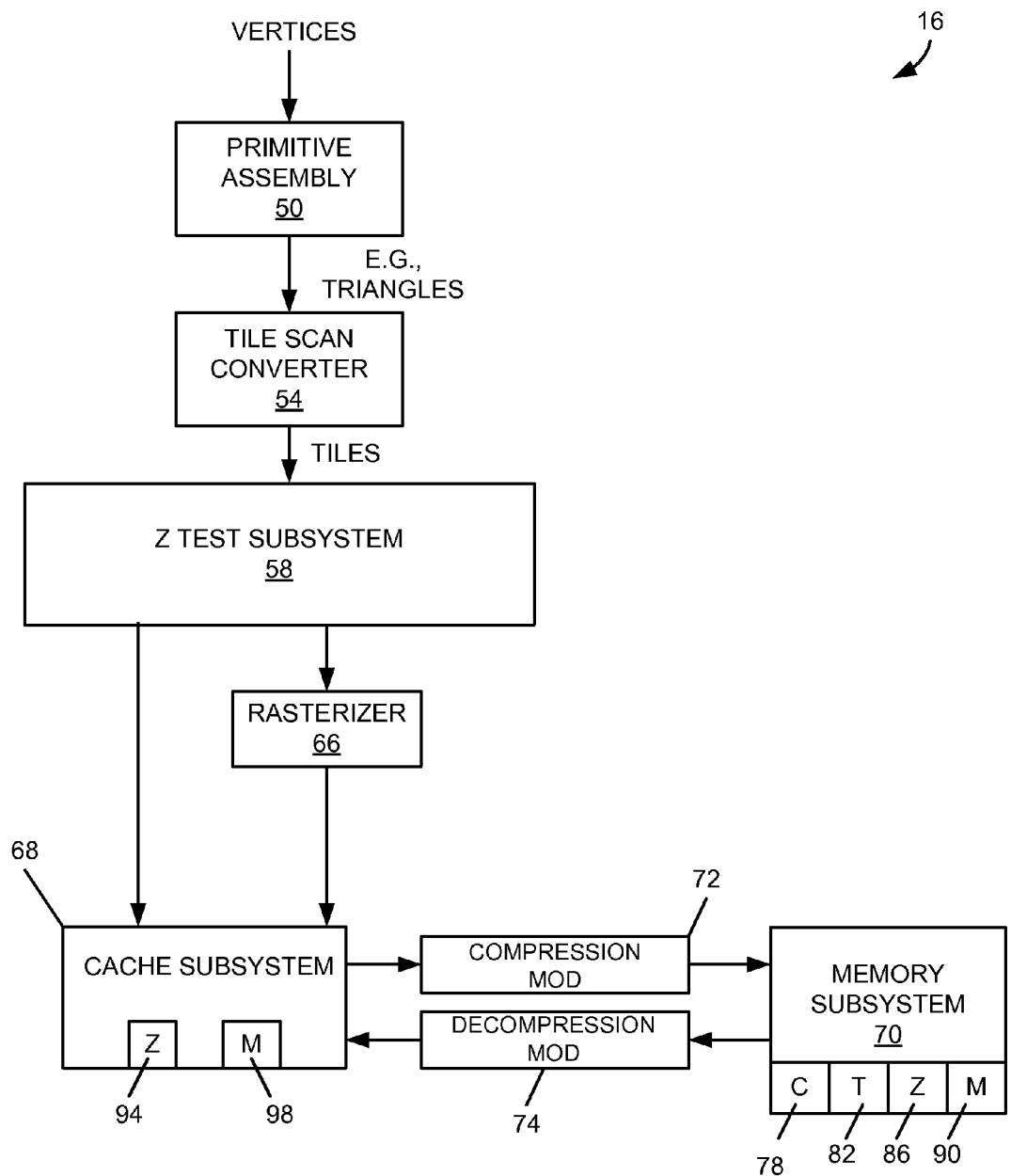
FIG. 2 is a functional block diagram representation of an embodiment of graphics pipeline of the graphics-processing unit.

FIG. 2 shows an embodiment of a 3D rendering pipeline of the graphics-processing unit 16. Each of the various components, modules, and subsystems of the graphics-processing unit 16 includes processor logic, which may be comprised of circuitry, software, or a combination thereof, for executing the particular functionality of that component, module, or subsystem.

The rendering pipeline includes a primitive assembly subsystem 50, a tile scan converter 54, and a Z test subsystem 58. The Z test subsystem 58 is in communication with a rasterizer 66 and with a cache subsystem 68. In one embodiment, the cache subsystem 68 is in communication with a memory subsystem 70 through a compression module 72 and through a decompression module 74.

The primitive assembly 50 receives vertices of graphics information obtained, for example, from the memory 20. From such vertices, the primitive assembly 50 produces graphics primitives (e.g., triangles, polygons). The primitive assembly 50 forwards the primitives to the tile scan converter 54, which identifies each tile fully or partially covered by a given primitive.

Associated with each tile is a set of (x, y) coordinate locations (corresponding to the pixels in the tile). In addition, each pixel of the tile has an associated Z-value. For example, the tile may have an associated Z-plane equation representative of the plane of the primitive and from which the Z-values of the pixels may be derived. For a given tile, there is a minimum Z value and a maximum Z value, each derived from the smallest depth value and the largest depth value, respectively, of all pixels in the tile. Together, the minimum Z and maximum Z values specify a range of Z values within a particular tile. The tile scan converter 54 sends the (x, y) coordinate locations and Z-value information of the tile to the Z test subsystem 58.

The Z test subsystem 58 performs an early Z test on the incoming tile to determine whether the incoming tile will fail (will not be drawn), will pass (may be drawn), or if the outcome is unknown (not determinable). Some embodiments of graphics-processing systems perform such testing on "quad tiles", i.e., a 4×4 quad tile for an 8×8 tile, and operate on four such quad tiles in parallel.

The detail rasterizer 66 broadly encompasses various rasterizing modules for performing detail rasterization on pixel tiles for which the Z test is indeterminate. Such modules can include a detail scan converter, a shader, and a late Z and stencil test module. A detail scan converter determines those pixels of a tile that are covered by the primitive, partially or fully, and produces a sample mask for each fully or partially covered pixel. In general, a shader includes logic for determining a final color and Z-value for a pixel, often adding complex shading effects, e.g., texture mapping and transparency, to the appearance of an object. To implement shading effects, the shader may communicate with a texture block in order to add a texture to the pixels being rendered. A late Z and stencil test module can be used to test the visibility of pixels.

The memory subsystem 70 includes a color (C) buffer 78, a texture (T) buffer 82, a Z buffer 86, and a mask buffer 90. The various buffers, or subsets of these buffers, may be part of a frame buffer (i.e., video memory allocated to hold the graphics information for the pixels from which the video display (i.e., a frame) is drawn). The color buffer 78 and texture buffer 82 hold color and texture data, respectively, for each pixel on the display screen 14. In the Z buffer 86 are the Z-values of rendered primitives: one Z-value for each pixel (or for each sample of a pixel).

The Z buffer 86 has dimensions equal to those of the color buffer 78 (i.e., one Z-value for each color value). In addition, the Z buffer 86 is partitioned into blocks of pixels (referred to as blocks or Z blocks, to distinguish them from tiles). Each Z block has a one-to-one correspondence with and the same dimensions as a tile 34 (FIG. 1). The invention can be practiced with one of a variety of block sizes, including, but not limited to, 2×2, 4×4, 4×8, 8×4, 8×8, and 16×16. In general, smaller block sizes result in more constant-value bit-planes than larger block sizes, but provide less bandwidth savings.

In one embodiment, the Z buffer 86 is a planar Z buffer, meaning that the grouping of Z-values of the pixels within a Z block is according to bit-planes, as described below in connection with FIG. 4B and FIG. 5B. In another embodiment, the Z buffer 86 is an offset-planar Z buffer, meaning that the Z-values of the pixels are adjusted by an offset value before being grouped into bit-planes, as described below in connection with FIG. 8A and FIG. 8B.

The mask buffer 90 maintains the indicator and value masks associated with each Z block of pixels. The mask data and the Z-values for a given Z block are closely associated; in general, any operation involving a Z block of Z-values also involves acquiring and evaluating the mask data associated with that Z block.

The cache subsystem 68 includes a first cache 94, referred to as a Z cache 94 for caching Z blocks, and a second cache 98, referred to as the mask (M) cache 98 for storing indicator and value masks. The Z cache 94 can store data for Z blocks in one of two formats: a compressed format and a normal format.

In the normal format, illustrated in FIG. 2, the Z cache 94 stores the data of a given Z block "as is", that is, as Z-values and not as bit-planes. Compression of a Z block occurs upon transfer of the Z block to the memory subsystem 70. The compression module 72 compresses the binary data of the Z block by identifying constant-value and mixed-value bit-planes in the Z values of that Z block. In addition, the compression module 72 generates an encoding (i.e., mask data) that identifies which bit-planes are constant-value bit-planes and which are mixed-value bit-planes. The encoding also provides a value for each constant-value bit plane. Decompression of a Z block occurs upon transfer of the Z block from the memory subsystem 70 to the cache subsystem 68. The decompression module 74 reconstructs the Z values of a Z block from the data of the mixed-value bit-planes and the encoding. The amount of bit-plane data transferred to and from the memory subsystem 70 depends on the number of mixed-value bit-planes in the Z block being compressed or decompressed.

In the compressed format, each Z block stored in the Z cache 94 is stored as bit-plane data from which the Z values of the pixels in that Z block can be reconstructed (i.e., decompressed) using its associated encoding stored in the M cache 98. When data is stored in the Z cache in compressed format, the cache and memory subsystems 68, 70 exchange "compressed" Z blocks (i.e., mixed-value bit-plane data and corresponding encoding). In this instance, the compression and decompression modules 72, 74 are not needed between the cache and memory subsystems 68, 70. Rather, compression and decompression occur when reading from (decompressing) and writing to (compressing) the cache subsystem 68.

In addition to, or instead of, storing the encoding—referred to hereafter as masks—the M cache 98 can store minimum and maximum Z values of Z blocks. The M cache 98 can hold more masks than the actual number of Z blocks currently stored in the Z cache 94. Mask entries in the M cache 98 can be arranged in blocks (e.g., 2×2, 4×4, and 8×8) or "supertiles" to improve memory access and caching efficiency.

In general, the Z cache 94 and M cache 98 operate independently. For example, Z blocks may be flushed from the Z cache 94 while the associated masks remains in the M cache 98. Conversely, though, masks cannot be flushed from the M cache 98 while associated Z blocks remain in the Z cache 94 because reconstruction (decompression) of the Z block depends upon the availability of the associated encoding in the M cache 98.

Because of this close correspondence between a Z block and its associated masks, when a Z block is fetched from the memory subsystem 70 for caching, or removed from the cache subsystem 68 for writing back to the memory subsystem 70, the particular operation also involves the corresponding masks. In one embodiment, the cache subsystem 68 uses a least recently used scheme to identify a Z block entry and its corresponding masks for removal from the cache and write-back to the memory subsystem 70.

Different cache sizes can be used to practice the invention, for example, 2K, 4K, 8K, 16K, and 32K. In general, performance related to rendering tiles improves with the larger caches sizes. For those embodiments that implement the principles of the present invention for color and/or texture data, the cache subsystem 68 can include caches for storing blocks of color and/or texture data, and their corresponding indicator and value masks.

Figure 3:
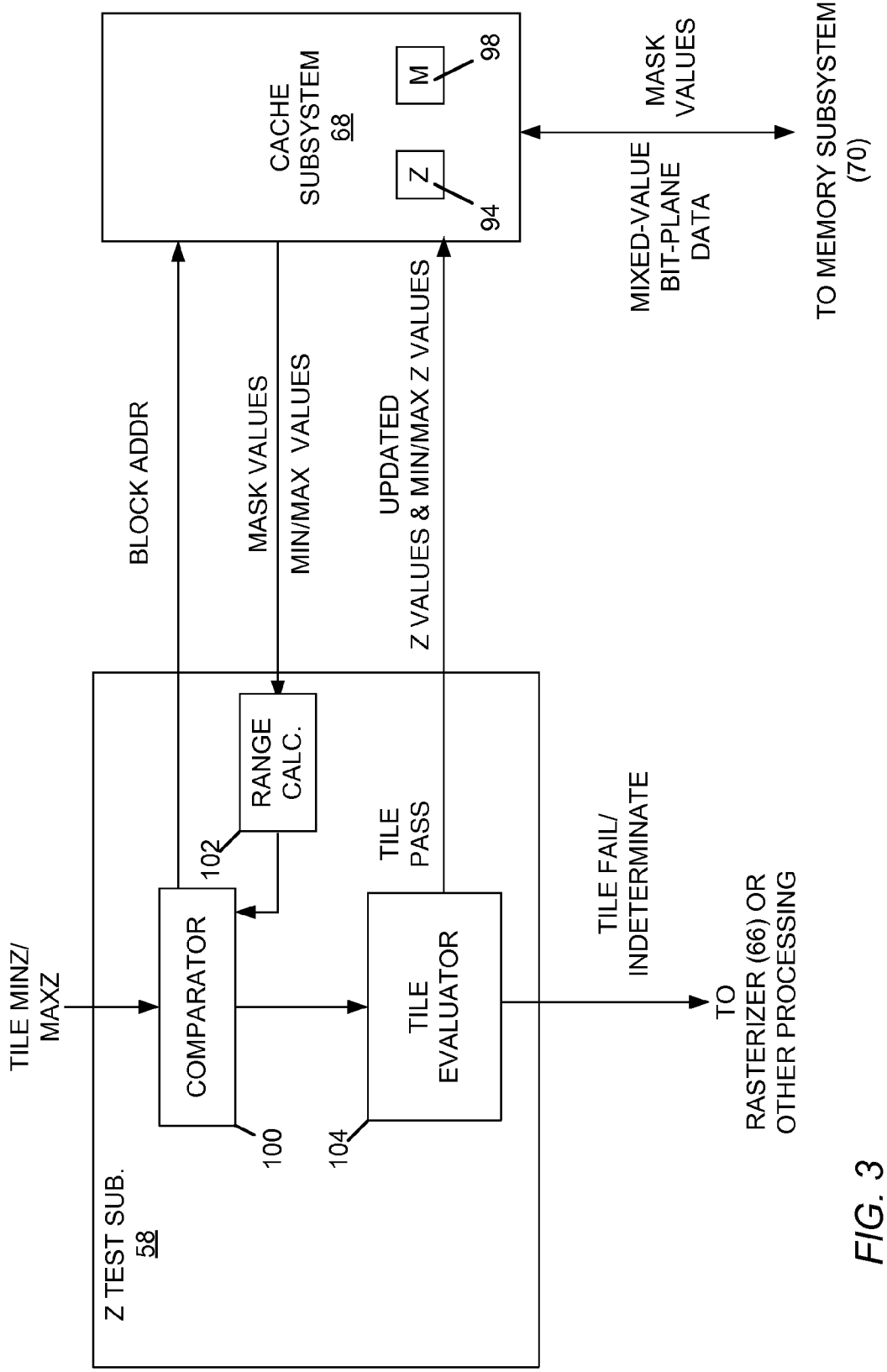
FIG. 3 is a functional block diagram representation of an embodiment of a Z test subsystem of the graphics-processing unit for testing incoming tiles.

FIG. 3 shows an embodiment of the Z test subsystem 58 including a comparator 100, a Z-value range calculator 102, and a tile evaluator 104. The comparator 100 is in communication with the tile scan converter 54 to receive a minimum Z value and maximum Z value for an incoming tile, and with the cache subsystem 68 to send thereto a Z-block address corresponding to the incoming tile. (Each incoming tile maps to a block of pixels in the Z buffer 86).

The cache subsystem 68 may need to retrieve the Z block and its corresponding mask data from the memory subsystem 70 if such information is not locally available in the caches 94, 98. Consider, for the sake of illustration, that the data of the Z block is stored in the Z cache 94 in normal format. The graphics-processing unit 16 directs the decompression module 74 to fetch the appropriate mixed-value bit-plane data and mask data from the memory subsystem 70, and to reconstruct the Z values of the Z block.

In addition, before retrieving the Z block and masks, the cache subsystem 68 may require the freeing of cache memory (i.e., writing of an old cached Z block and its corresponding mask data to the memory subsystem 70). In this event, the compression module 72 identifies constant-value and mixed-value bit-planes for the old cached Z block and generates the corresponding mask data. The write back then entails writing the mask data and the bit-plane values for the mixed-value bit-planes to the memory subsystem 70—the bit-plane values for constant-value bit-planes are not written to the memory subsystem 70. Whether decompressing or compressing, the amount of bit-plane data read from or written back to the memory subsystem 70 depends on the number of mixed-value bit-planes in the transferred Z block. The fewer there are of mixed-value bit-planes in the transferred Z block, the less bit-plane data read from or written to the memory subsystem 70.

Conceivably, modifications to a cached Z block may render irrelevant all bit-plane values for that block, because the masks define all data for the entire Z block. For example, a primitive that is coplanar to the front clip plane covers the entire block, and results in all bit-planes associated with the block being constant-value bit-planes. Consequently, the write back (i.e., compression) of the Z block to the memory subsystem 70 entails generating and writing the masks only (without any access to the Z cache 94 storing Z block data).

The Z-value range calculator 102 is in communication with the cache subsystem 68 and the comparator 100. The cache subsystem 68 sends the mask data and/or minimum and maximum Z values associated with the Z-block address to the Z-value range calculator 102. From the information obtained from the cache subsystem 68, the Z-value range calculator 102 produces a Z-value range, and provides this Z-value range to the comparator 100. For embodiments in which the M cache 98 stores mask data only (i.e., no minimum and maximum Z values), the Z-value range calculator 102 calculates the minimum and maximum Z values from the mask data dynamically.

Modifications to a cached Z block can result in changes to the minimum or to the maximum Z value (or both) for that Z block. For embodiments in which the M cache 98 stores minimum and maximum Z values for cached Z blocks, the M cache 98 becomes updated accordingly when a minimum or maximum Z value for a given Z block changes.

Having the minimum and maximum Z-values of the incoming tile and the Z-value range of the corresponding Z block, the comparator 100 determines and sends the pass/fail status of the incoming tile to the tile evaluator 104. If the tile will not be drawn (all pixels are occluded), or if the status of the tile is indeterminate, the tile evaluator 104 forwards the tile to the rasterizer 66 for further processing (e.g., culling, pixel-by-pixel rasterization).

If, instead, the tile may be drawn (i.e. the tile passes because all pixels of the tile are presently visible), the processing of the tile can proceed from the Z test subsystem 58 to the updating of Z values in the Z cache 94 and of the minimum and maximum Z values in the M cache 98 (if the M cache 98 stores minimum and maximum Z values).

The mask data and mixed-value bit-planes for this tile can also be written back in the memory subsystem 70, depending upon the caching policy implemented by the graphics-processing unit 16. For example, the rasterization order can provide insight for establishing a caching policy: Z blocks completely covered by the primitive being rasterized are less likely to be reused when rendering the next primitive, so caching such blocks may not be beneficial.

Although shown to be part of the Z test subsystem 58, the Z-value range calculator 102 may be separate from the Z test subsystem 58. In addition, early Z testing is an optional feature of the invention; the invention may be practiced without early Z testing.

Planar Z Buffer

Bit-planes are instrumental in reducing the amount of memory bandwidth expended when working with blocks of Z-values. FIG. 4A illustrates a conventional manner for representing Z-values in the Z buffer 86 for a block 110 of pixels and FIG. 4B shows the same block of pixels rearranged into bit-planes. Bit-planes fall into one of two categories: constant-value bit-planes and mixed-value bit-planes. The rearrangement of Z-values produces a different set of Z values, called bit-plane values.

Figures 4A, 4B:
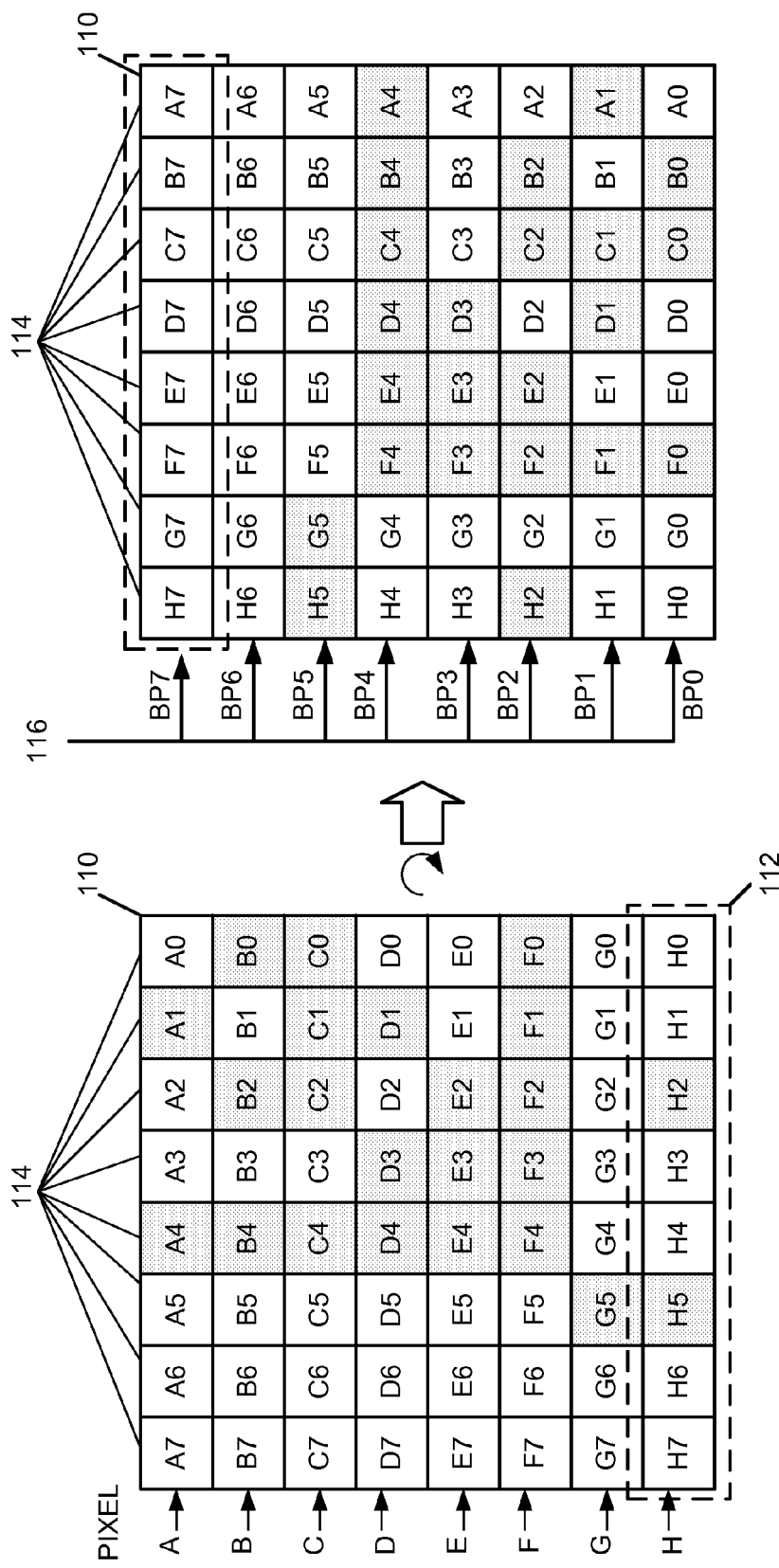
FIG. 4A is a diagram of an embodiment of an exemplary block of eight pixels as typically organized within a buffer, each pixel having eight bits of data.
FIG. 4B is a diagram of the block of eight pixels rearranged into bit-planes.

As shown in FIG. 4A, pixel block 110 comprises eight pixels labeled A through H. Each of the eight pixels has an eight-bit Z-value 112. For example, pixel A includes bits 114, labeled A0 to A7, with A7 being the most significant bit and A0 the least significant bit. Bits having a "1" value are shaded, those having a "0" value are unshaded. For example, the Z-value represented by the binary data of pixel A is equal to 0x12 (in hexadecimal), the value for pixel B is equal to 0x15, the Z-value for pixel C is 0x17, etc.

FIG. 4B shows a different arrangement for the Z-values 112 of block 110. This arrangement corresponds to the planar Z buffer mentioned previously. For each Z-value 112 in the block 110, all bits at the same bit position (or index) are grouped together. Each grouping defines a bit-plane 116. A 90-degree clockwise rotation of the exemplary block 110 of pixels (of FIG. 4A) facilitates illustration of each bit-plane 116. With this arrangement, the size of a bit-plane 116 should align with a word boundary, although the number of bits within a bit-plane 116 is unlimited. In the example shown, there are eight bit-planes 116 (BP0 through BP7), one bit-plane for each of the eight bit positions of a Z-value. For example, bit-plane BP0 comprises bits H0, G0, F0, E0, D0, C0, B0, and A0, and bit-plane BP7 comprises bits H7, G7, F7, E7, D7, C7, B7, and A7.

Because primitives often cover large sections of the Z buffer 86, the Z-values tend to form shallow gradients (i.e., for a given block of pixels, there may be little or no variation in depth). When the Z buffer 86 is translated into to bit-planes, some of the bit-planes are comprised entirely of bits with the same bit value (i.e., all bits either on or off). Typically, the shallow gradient leads to constant-value bit-planes appearing at the more significant bits of the Z-values 112. As FIG. 4B illustrates, the similarity in the Z-values within the block 110 produces two constant-value bit-planes BP6 and BP7. Here, each of the bit-planes BP6, BP7 is comprised entirely of all zero values. Constant-value bit-planes may also appear between mixed-value bit-planes, for example, if bit-plane BP4 had instead been a constant-value bit-plane located between mixed-value bit-planes BP3 and BP5.

Figures 5A, 5B:
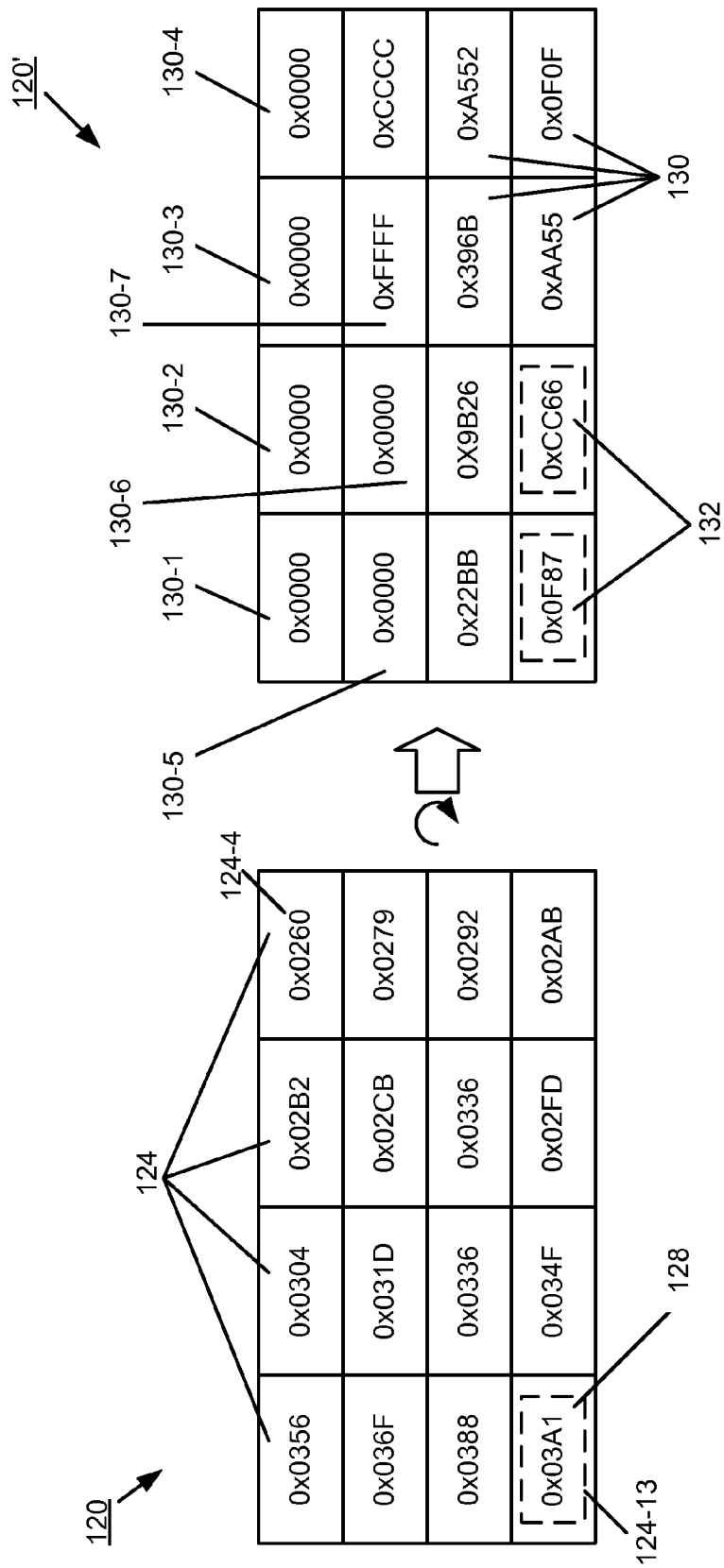
FIG. 5A is a diagram of another embodiment of an exemplary 4×4 block of pixels as typically organized within a buffer, each pixel having 16 bits of data.
FIG. 5B is a diagram of the 4×4 block of pixels rearranged into bit-planes.

FIG. 5A shows another exemplary block 120 of pixels 124. In this example, the 4×4 block 120 has 16 pixels 124, each pixel 124 having 16 bits of data corresponding to their Z-values. The actual Z-values shown are merely exemplary. This particular arrangement in FIG. 5A is a conventional representation of Z-values within the Z buffer 86.

FIG. 5B shows a block 120' of pixels, corresponding to the block 120 of FIG. 5A after the block 120 is rearranged into bit-planes 130. Each of the first six bit-planes 130-1, 130-2, 130-3, 130-4, 130-5, and 130-6 are comprised entirely of bit values equal to 0 (i.e., 0x0000). The seventh bit-plane 130-7 is comprised entirely of bit values equal to 1 (i.e., 0xFFFF). The remaining bit-planes have a mix of 0 and 1 bit values and thus have bit-plane values 132 other than 0x0000 and 0xFFFF (e.g., 0xCCCC and 0x22BB). The first seven bit-planes are examples of constant-value bit-planes, and the remaining bit-planes, of mixed-value bit-planes.

When the translation of a block produces one or more constant-value bit-planes, the actual data of these bit-planes need not be stored in the Z buffer 86. Rather, an encoding can represent the bit-plane value of a given constant-value bit-plane: one bit identifies whether the bit-plane is a constant-value bit-plane, and another bit indicates the particular constant value (0 or 1).

In one embodiment, the encoding includes a pair of bit masks that records the encoding bits for the bit-planes. A first bit mask, referred to previously as an indicator mask, has one bit for each bit-plane. That bit identifies whether the corresponding bit-plane is a constant-value bit-plane. The second bit mask, referred to previously as a value mask, has one bit for each bit-plane. That one bit provides the bit value of each bit of that bit-plane if the indicator mask identifies that bit-plane as a constant-value bit-plane; otherwise, the bit value is not relevant.

Figure 6:
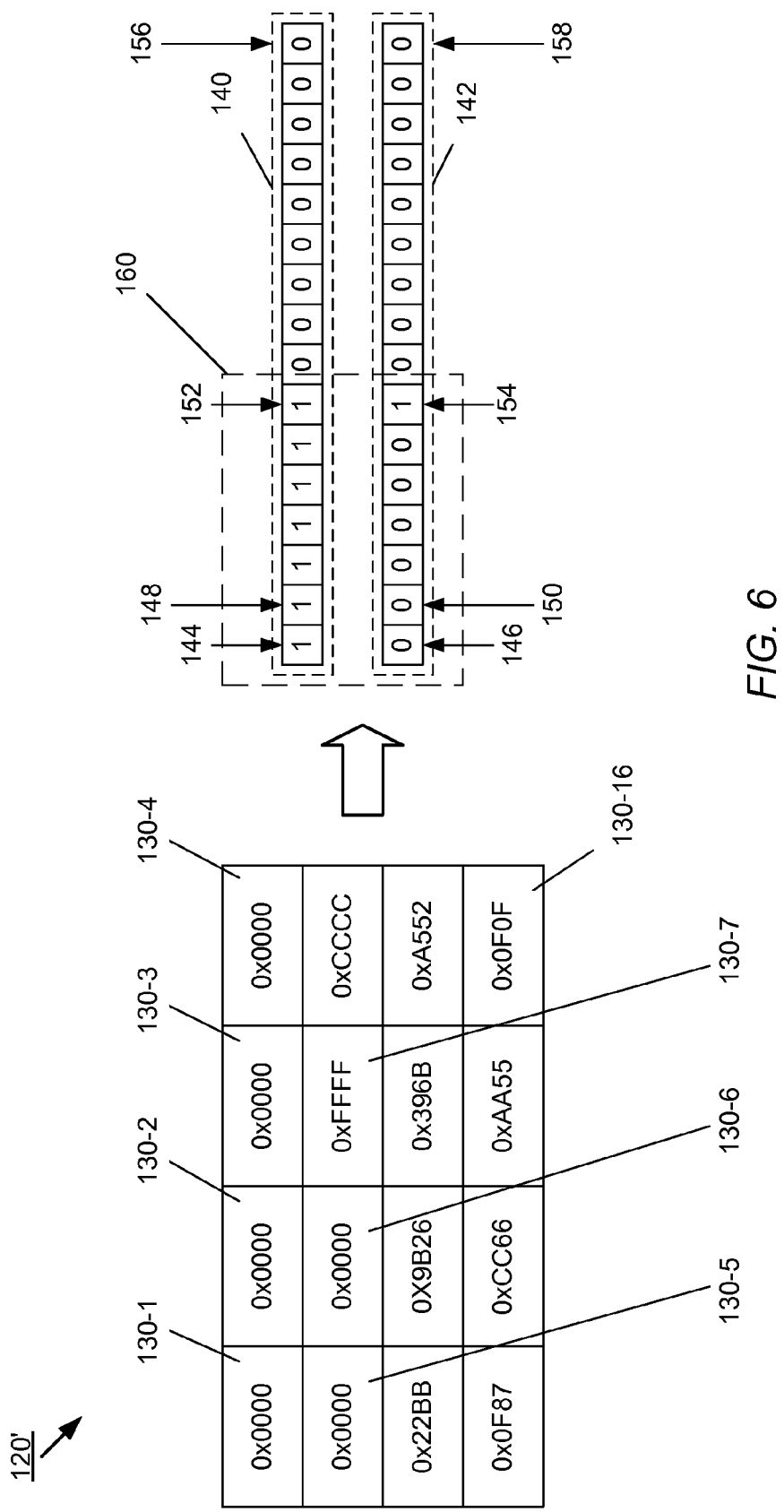
FIG. 6 is a diagram of embodiments of an indicator mask and a value mask defined based on the bit-plane values of the bit-planes of FIG. 5B.

FIG. 6 illustrates an exemplary encoding for the bit-planes 130 of FIG. 5B using an indicator mask 140 and a value mask 142. Each mask 140, 142 has as many bits as bit-planes (here, 16). A given bit position within each mask 140, 142 is associated with a particular bit-plane 130. For example, the most significant bit position 144 of the indicator mask 140 and the most significant bit position 146 of the value mask are both associated with bit-plane 130-1; the next most significant bits 148, 150 of the masks 140, 142, respectively, are associated with bit-plane 130-2; the seventh most significant bits 152, 154, with bit-plane 130-7; and the least significant bits 156, 158, with bit-plane 130-16.

As described in FIG. 5B, the first seven bit-planes 130-1 through 130-7 are examples of constant-value bit-planes. The bit positions in the indicator mask 140 corresponding to these seven bit-planes each has a bit value that indicates the corresponding bit-plane is a constant-value bit-plane. In this example, a bit value of "1" indicates that the corresponding bit-plane is a constant-value bit-plane. The remaining bit positions of the indicator mask 140 have the opposite bit value of "0". Alternatively, a bit value of "0" could be used to identify a constant-value bit-plane; a bit value of "1", a mixed-value bit-plane.

The value mask 142 provides the constant value for each bit of those constant-value bit-planes. In this example, the seven most significant bits (within the box 160) convey this value. The remaining bits of the value mask 142 have no meaning because such bits correspond to mixed-value bit-planes. Zeros can be used to fill these remaining bit positions. Accordingly, the hexadecimal values of the indicator mask 140 and value mask 142, based on the bit-planes 130 of FIG. 5B, are 0xFE00 and 0x0200, respectively.

Taken together, the indicator and value masks 140, 142 can produce the bit-plane value for each constant-value bit-plane. For example, the seventh most significant bits 152, 154 of the indicator and value masks 140, 142, respectively, indicate that the seventh bit-plane 130-7 of the Z buffer block 120 has a "1" value for all bits in that bit-plane; accordingly, the bit-plane value of that bit-plane 130-7 is 0xFFFF. In addition, when combined with bit-plane values of the mixed-value bit-planes, the masks 140, 142 enable reconstruction of every bit-plane value of the translated block 120, from which the Z-value of each pixel in the block 120 may be derived (i.e., by a 90-degree counter-clockwise rotation).

Figure 7:
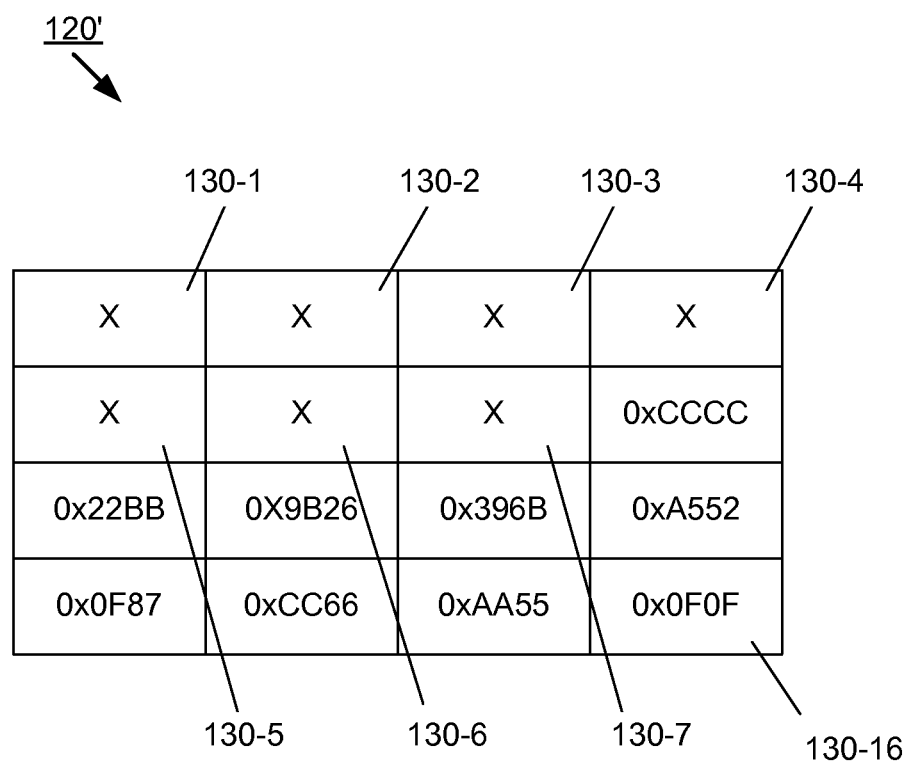
FIG. 7 is a diagram of block of bit-planes of FIG. 5B and an example of the bit-values as stored in the buffer.

FIG. 7 shows the bit-plane values of the block 120' as stored within the Z buffer 86 of the memory subsystem 70. The actual bit-plane values stored within the first seven bit-planes 130-1 through 130-7 are irrelevant (i.e., "don't care"—X) and may not be known: they are irrelevant because the current bit-plane values of these bit-planes 130-1 through 130-7 are reconstructible from the indicator and value masks 140, 142.

The ability to reconstruct the data for constant-value bit-planes from the masks 140, 142 can lead to bandwidth savings through smaller data transfers because it is unnecessary to transfer data to and from the Z buffer 86 for constant-value bit-planes. That is, the graphics-processing unit 16 can instead calculate the bit-plane values of these constant-value bit-planes from the indicator and value masks 140, 142. Data transfer for the above Z block 120', for example, would entail 18 bytes (to obtain the bit-plane values of the nine mixed-value bit-planes), rather than 32 bytes for the unconverted Z block 120 of FIG. 5A. Accessing the mask data in the masks 140, 142 diminishes this bandwidth savings by 4 bytes. As used herein, an access to bit-plane values and mask data can occur during read and write operations.

As another advantage, the indicator and value masks 140, 142 enable preliminary Z-value tests of incoming tiles (i.e., by the Z test subsystem 58) without having to retrieve blocks from the Z buffer 86. Because the constant-value bit-planes are typically at the most significant bit positions of the Z-values, the values of the indicator and value masks 140, 142 can provide a means for constructing a potential range of Z-values for a corresponding Z block. The minimum possible Z-value is equal to the value of the value mask 142, and the maximum possible Z-value is equal to the sum of the value mask with a bit-negation of the indicator mask 140.

The bit negation, in effect, sets all "unknown" bits of the indicator mask 140 to a value of "1"—provided "0"s are used to represent mixed-value bit-planes—to reflect a maximum possible value for each unknown bit. (Unknown bits correspond to mixed-value bit-planes). Then those negated unknown bits are added to the value of those bits known to be at a value of "1" (as identified by the value mask) to obtain the maximum possible Z-value. Using the mask values shown in FIG. 6 for Z block 120', for example, the minimum possible Z-value is 0x0200 and the maximum Z-value is 0x03FF (i.e., 0x0200+0x01FF).

Offset-Planar Z Buffer

In another embodiment, the Z buffer 86 is an offset-planar Z buffer, with the Z-values of the pixels within the block being adjusted by an offset before being grouped into bit-planes. Before grouping the Z-values of a block into bit-planes, the block is searched to identify the minimum Z-value in the block. This minimum Z-value is then subtracted from each Z-value in the block.

Figures 8A, 8B, 8C:
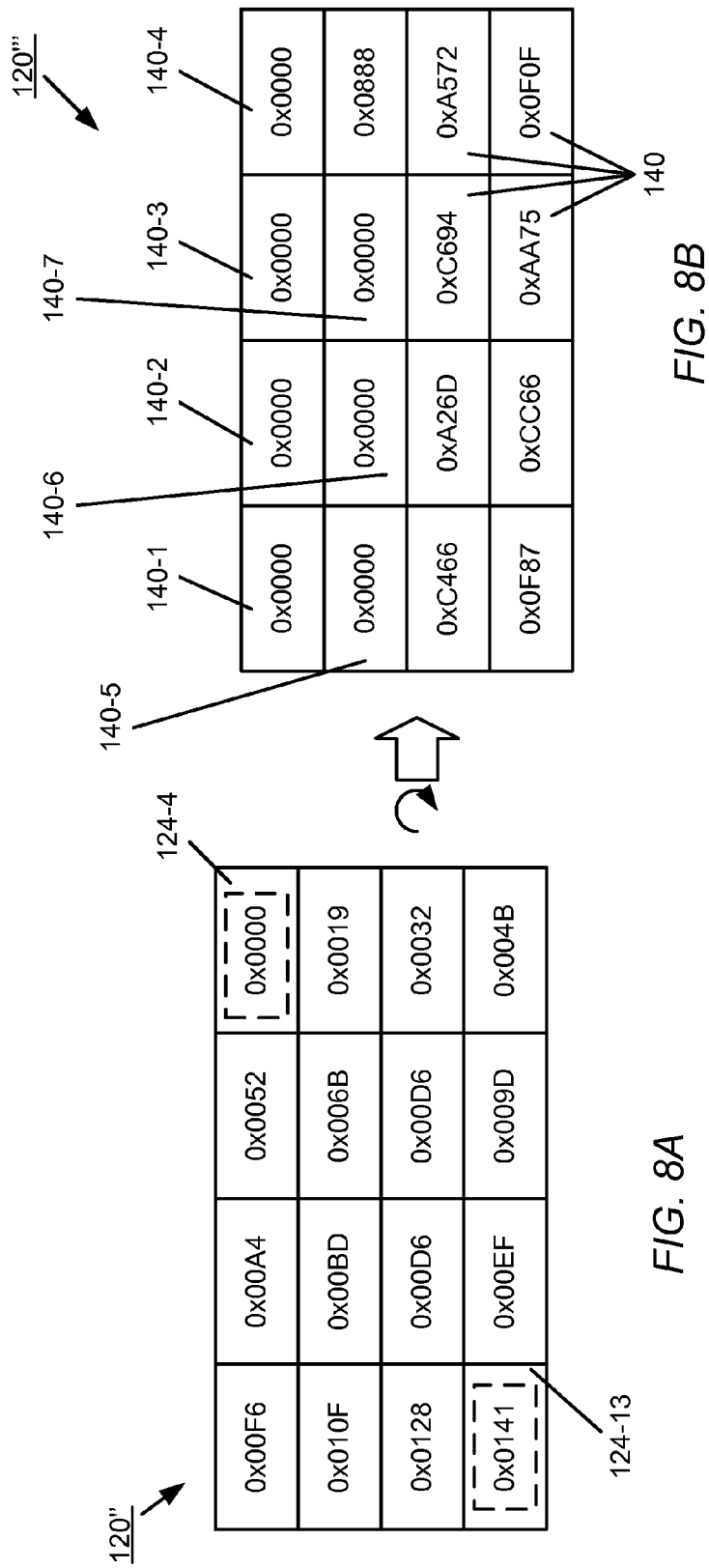
FIG. 8A is a diagram of the 4×4 block of pixels of FIG. 5A after subtracting the minimum value of the block from the value of each pixel in the block.
FIG. 8B is a diagram of the 4×4 block of pixels of FIG. 8A rearranged into bit-planes.
FIG. 8C is a diagram of a set of bit values corresponding to a pixel of the block of pixels of FIG. 8A.

In FIG. 5A, for the block 120 of pixels, pixel 124-4 has the minimum Z-value for the block 120 (here, 0x0260) and pixel 124-13 has the maximum Z-value of the block 120. FIG. 8A illustrates the results of subtracting the minimum Z-value from each Z-value. After subtraction, as shown in block 120", the value of pixel 124-4 becomes 0x0000 and that of pixel 124-13 becomes 0x0141. Because pixel 124-13 has the maximum Z-value for the block, the post-subtraction result also corresponds to the range of values in the original block 120.

FIG. 8B shows a block 120''' of pixels representing the post-subtraction block 120" of Z-values rearranged into bit-planes 140. In general, subtracting an offset before translating the Z-values into bit-planes is conducive to producing more constant-value bit-planes than if no offset is used. In this example, however, the use of an offset has resulted in producing the same number of constant-value bit-planes (i.e., seven) as the planar Z buffer arrangement of FIG. 5B, which uses no offset. Notably, the constant-value bit-plane 130-7 of the planar Z buffer remains a constant-value bit-plane 140-7 in the offset-planar Z buffer, but the bit-plane value has changed from 0xFFFF to 0x0000. This illustrates that all constant-value bit-planes within an offset-planar Z buffer will have a bit-plane value equal to zero. This result is useful in reconstructing bit-plane values for constant-value bit-planes.

This result also enables offset-planar Z buffer embodiments to forego the use of indicator and value masks because the contents of such masks are derivable from the highest Z value resulting from the subtraction. More specifically, those bits above the highest bit of the highest post-subtraction Z-value that is equal to "1" correspond to constant-value bit-planes. In addition, as previously noted, all such constant-value bit-planes have a bit-plane value equal to zero.

FIG. 8C illustrates an encoding provided by the highest post-subtraction Z-value by which constant-value bit-planes may be identified. In this example, pixel 124-13 has the highest Z-value of the pre-translated block 120": 0x0141. The seven most significant bits 142 of this value 124-13 are equal to zero, which signifies the seven constant-value bit-planes 140 that result when translating the post-subtraction Z block 120" into bit-planes 140. Conversely, the graphics-processing unit 16 can consider the nine least significant bits 144 of this value 124-13 to correspond to mixed-value bit-planes, although, in some instances, "holes" in the mixed-value bit-planes may be present, that is, a constant-value bit-plane may arise in one or more of these lower bit positions. In general, such holes can be ignored because memory accesses (reads and writes) cannot typically skip small portions of data.

Instead of storing indicator and value masks, this embodiment stores the base value of the block (i.e., the pre-subtraction minimum Z value) and the computed range (i.e., pre-subtraction maximum Z-value minus pre-subtraction minimum Z-value). The technique can advantageously achieve more accurate preliminary Z testing than by using the indicator and value masks because the minimum and maximum values of the pre-subtraction block 120 are exactly known, rather than estimated.

Fast Clear Operation

Using masks 140, 142 to define the bit-plane values of constant-value bit-planes and to forego accessing the Z buffer 86 for data associated with constant-value bit-planes advantageously provides means for a fast clear mechanism. In brief overview, a video-graphics system can use fast clear operations to clear or reset the data stored in the Z buffer to a default or reset Z value (e.g., zero).

Figure 9:
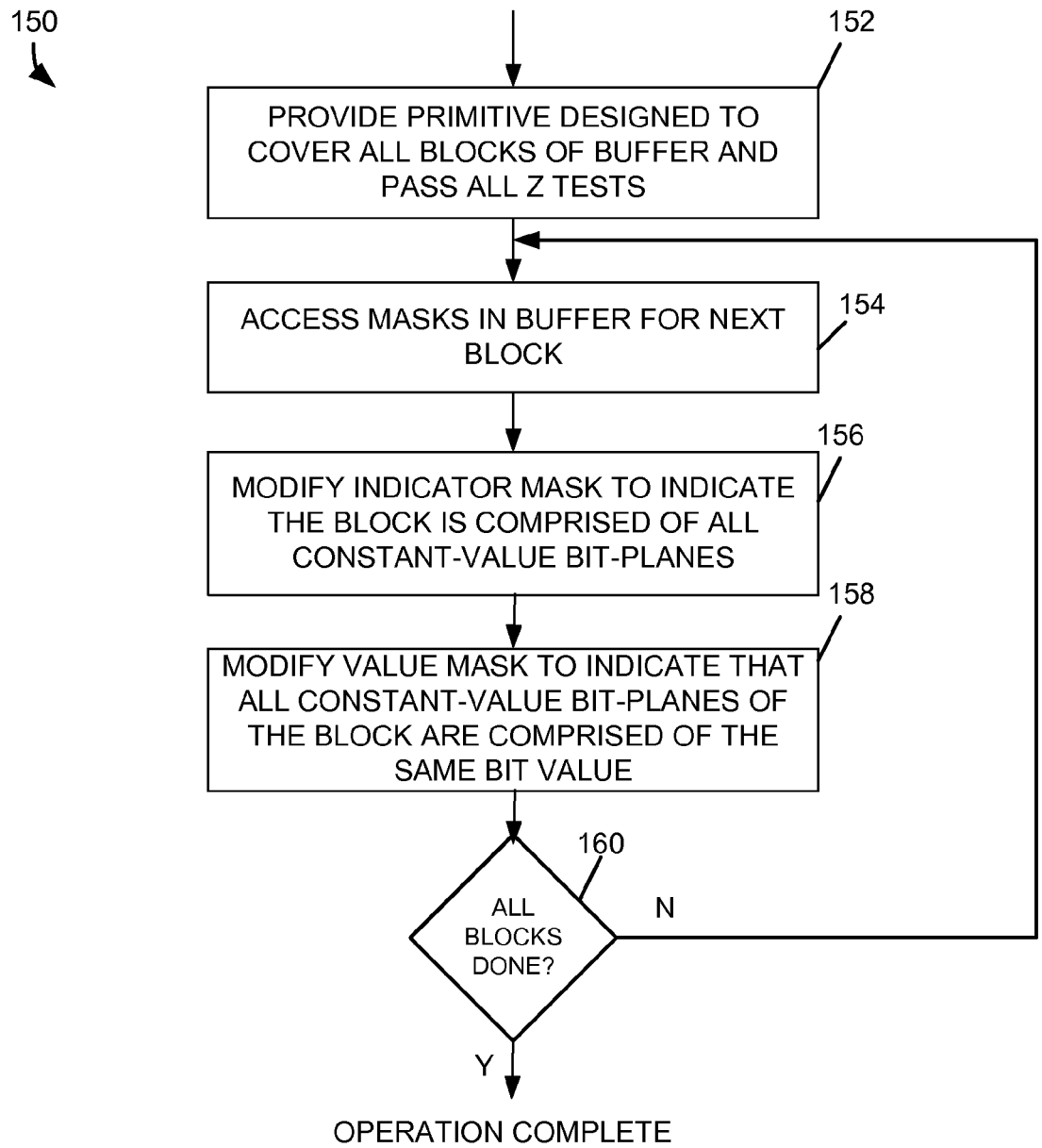
FIG. 9 is a flow diagram of an embodiment of a process for performing a fast clear operation.

FIG. 9 shows an exemplary process 150 for performing a fast clear operation of a planar Z buffer. When performing a fast clear operation, the video-graphics system scans through the blocks in the Z buffer. To initiate the fast clear operation, the graphics-processing unit 16 can receive (step 152) a primitive designed to cover all blocks of the Z buffer 86 and to pass all Z tests (i.e., a primitive that is coplanar to the front clip plane, covers all blocks in their entirety, and results in each block being comprised entirely of constant-value bit-planes). For each block in sequence, the graphics-processing unit 16 accesses (step 152) the corresponding masks 140, 142 in the mask buffer 90, modifies (step 156) the indicator mask to indicate that the block is comprised entirely of constant-value bit-planes, and modifies (step 158) the value mask so that the bit-planes values of all bit-planes are the same value. The graphics-processing unit 16 repeats (step 160) the process until all blocks are done. The fast clear operation thus completes without writing any bit-plane values to the Z buffer 86.

For example, setting the bit-planes values of all bit-planes to the same default value (e.g., all 0's) can be accomplished by setting the indicator mask 140 associated with each Z block in the Z-buffer 86 to all "1s" and setting the value mask 142 for all Z blocks to all "0s". This fast clear operation achieves a significant bandwidth reduction: for just one Z block, such as the one shown in FIG. 5A, the fast clear operation reduces the number of bytes written from 32 bytes to 4 bytes.

If the Z buffer 86 is an offset-planar Z buffer, the fast clear operation can be accomplished by writing all zeros to the base value and to the computed Z range for each Z block. Again, the number of bytes written reduces from 32 bytes to 4 bytes for clearing a single Z block.

Figure 10A:
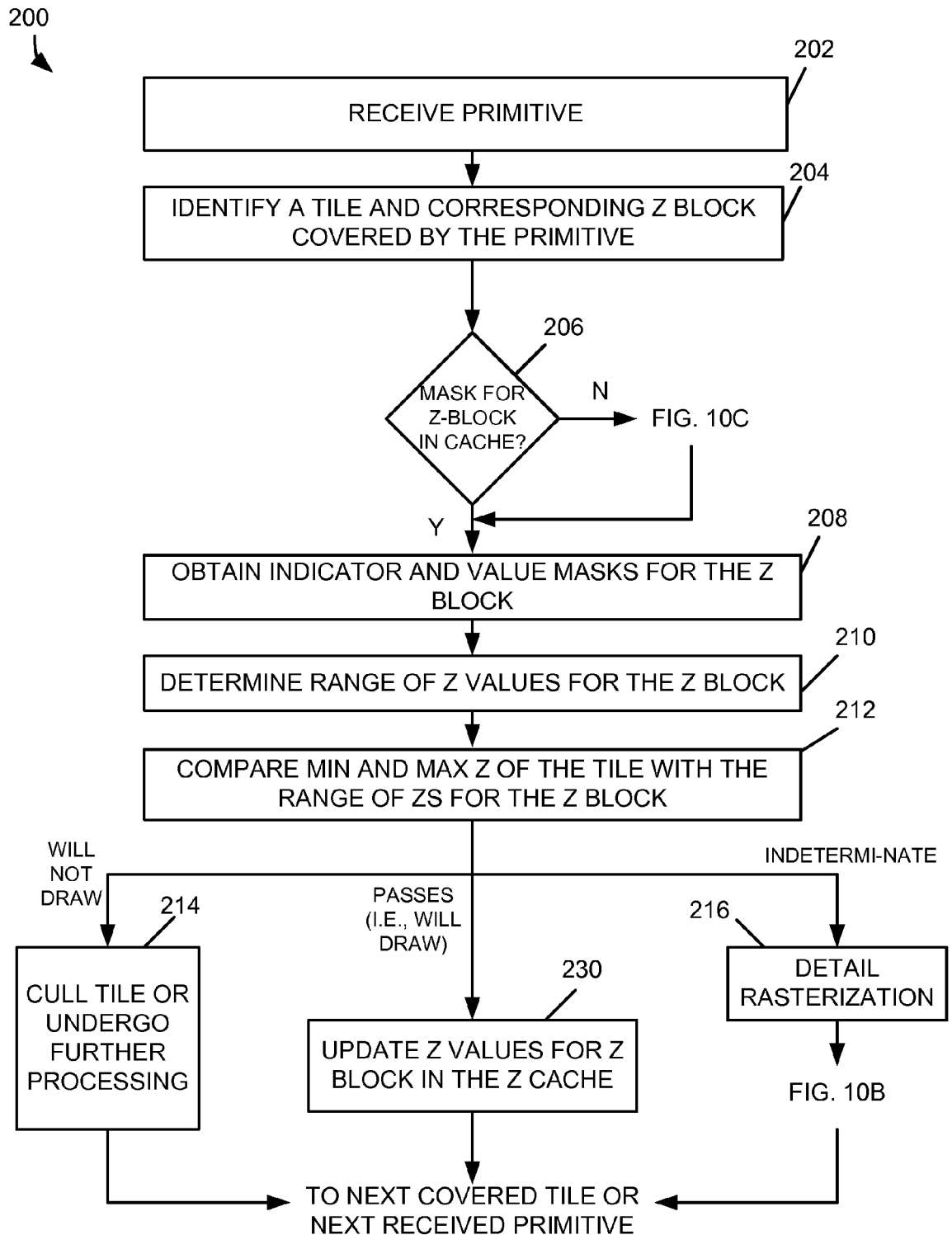
FIGS. 10A, 10B, and 10C comprise a flow diagram of an embodiment of a process for testing incoming tiles, the process illustrating the use of bit-planes during reading and writing from the buffer.
Figure 10B:
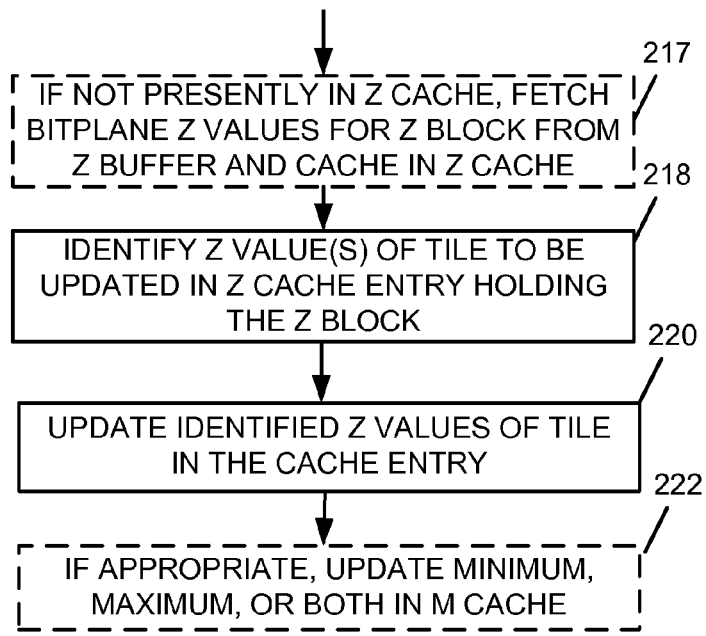
Figure 10C:
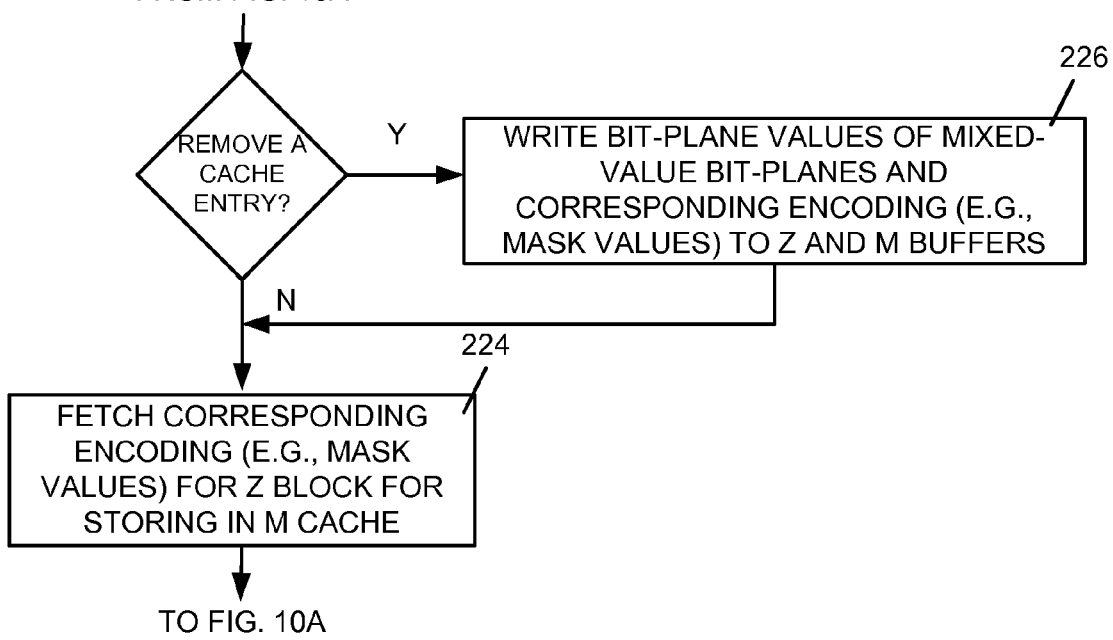

FIG. 10A, FIG. 10B, and FIG. 10C together show an embodiment of a process 200 for testing an incoming tile associated with a primitive that is being rendered. In the description of the process 200, reference is also made to FIG. 2 and FIG. 3. For purposes of illustrating the process, the Z buffer 86 is a planar buffer. At step 202, the tile scan converter 54 receives a primitive. The tile scan converter 54 identifies (step 204) a tile partially or fully covered by the primitive and forwards the tile to the Z test subsystem 58. A determination (step 206) is made regarding whether the masks for the Z block, corresponding to the tile, presently reside in the M cache 98.

If the M cache 98 has the masks for the corresponding Z block, the Z-value range calculator 102 obtains (step 208) the indicator and value masks associated with that block. From the masks, the Z-value range calculator 102 computes (step 210) a Z-value range for the block. For an M cache 98 that holds minimum and maximum Z values, the Z-value range calculator 102 can instead acquire these Z values directly (i.e., foregoing any calculations). In an offset-planar Z buffer embodiment, the Z test subsystem 58 instead obtains the minimum Z value and range of Z values corresponding to this block and computes the maximum Z value therefrom.

Comparing the minimum and maximum Z values of the tile with those of the Z block, the Z test subsystem 58 determines (step 212) a status for the tile. If the status is that the tile will not be drawn, the tile may be culled (step 214)—no additional processing is expended on this tile. Notably, primitives processed in a front-to-back order achieve greater benefit from such culling than if processed in a back-to-front order. Alternatively, the tile may undergo additional processing.

If the tile status is indeterminate, the tile undergoes detail rasterization (step 216), involving access to the Z values stored in the Z cache 94 and to the masks and, depending upon the particular implementation, the minimum or maximum Z values stored in the mask cache 98 for the corresponding Z block. Referring to FIG. 10B, during this detail rasterization, the graphics-processing unit 16 fetches and caches (step 217) the Z values for the corresponding Z block from the Z buffer 86 of the memory subsystem 70 if this Z block is not presently in the Z cache 94. The graphics-processing unit 16 may determine to modify (step 218) a Z value of one or more of the pixels of the Z block in the Z cache (e.g., if the Z value of the tile is lower than the corresponding Z value presently in the Z block). Such identified Z value(s) of the tile are updated (step 220) in the appropriate cache entry in the cache subsystem 68. For an M cache 98 storing minimum and maximum Z values for Z blocks, the minimum Z value, the maximum Z value, or both, are updated (step 222) if the updated Z value(s) correspond to new minimum or maximum Z values for the cached Z block.

Typically, such modifications of the Z values for a Z block require a new determination of the bit-plane values and the corresponding indicator and value masks for the Z block. This new determination can occur when the Z block is written back from the cache subsystem 68 to the memory subsystem 70. The graphics-processing unit 16 can store the masks and the bit-plane values for the newly determined mixed-value bit-planes for the Z block in the memory subsystem 70, in the cache subsystem 68, or in both.

If, instead, at step 212 (FIG. 10A), the Z test subsystem 58 determines that the tile will pass, the graphics-processing unit 16 updates (step 230) all Z values for the Z block in the Z cache 94 of the cache subsystem 68 (i.e., to correspond to the Z values of the tile). In addition, for an M cache 98 that stores minimum and maximum Z values, the minimum and maximum Z values for the Z block are updated.

Referring to FIG. 10C, if, instead, the masks for the corresponding Z block are not in the M cache 98 (step 206 of FIG. 10A), the graphics-processing unit 16 fetches (step 224) the indicator and value masks for the corresponding Z block from the M buffer 90 of the memory subsystem 70. The indicator and value masks and, possibly, the minimum and maximum Z values are stored in the M cache 98. Fetching such mask data may require removing a Z block from the Z cache 94 and writing the information of that Z block back to the memory subsystem 70. In such an event, before the fetch of the mask data occurs, the graphics-processing unit 16 fetches the Z values from the Z cache 94 (from a selected Z cache entry), compresses the Z values into bit-plane values and mask values, and writes (step 226) the bit-plane values of the mixed-value bit-planes of the removed cache entry to the appropriate block of the Z buffer 86 and the indicator and value masks to the mask buffer 90.

Although described herein predominantly as hardware, embodiments of the described invention may be implemented in hardware (digital or analog), software (program code), or combinations thereof. Program code implementations of the present invention may be embodied as computer-executable instructions on or in one or more articles of manufacture, or in or on computer-readable medium. A computer, computing system, or computer system, as used herein, is any programmable machine or device that inputs, processes, and outputs instructions, commands, or data. In general, any standard or proprietary, programming or interpretive language can be used to produce the computer-executable instructions. Examples of such languages include C, C++, Pascal, JAVA, BASIC, Visual Basic, and C#.

Furthermore, while an embodiment of the present invention is illustrated as being embodied in a graphics processor that is separate and distinct from the central processor, persons of ordinary skill in the art will understand and appreciate that the graphics processor may form part of another device including, for example, a central processing unit, a north bridge device, a baseband processor, an applications or media processor or the like.

Examples of articles of manufacture and computer-readable medium in which the computer-executable instructions may be embodied include, but are not limited to, a floppy disk, a hard-disk drive, a CD-ROM, a DVD-ROM, a flash memory card, a USB flash drive, an non-volatile RAM (NVRAM or NOVRAM), a FLASH PROM, an EEPROM, an EPROM, a PROM, a RAM, a ROM, a magnetic tape, or any combination thereof. The computer-executable instructions may be stored as, e.g., source code, object code, interpretive code, executable code, or combinations thereof.

While the invention has been shown and described with reference to specific preferred embodiments, it should be understood by those skilled in the art that various changes in form and detail may be made therein without departing from the spirit and scope of the invention as defined by the following claims.

What is claimed is:

1. A graphics processor comprising:
    logic grouping binary data of a block of pixels into a plurality of bit-planes, each bit-plane corresponding to a different bit position in the binary data of the block of pixels and including a bit value from each pixel in the block at that corresponding bit position;
    an encoding, associated with the block of pixels, that represents which one or more of the bit-planes is a constant-value bit-plane having binary data comprised of a same bit value from every pixel in the block and which one or more of the bit-planes is a mixed-value bit-plane, wherein the encoding includes:
        an indicator mask having one bit for each bit-plane of the block of pixels, each bit of the indicator mask having a bit value that indicates whether the corresponding bit-plane is a constant-value bit-plane; and
        a value mask having a bit for each constant-value bit-plane of the block, each bit of the value mask having a bit value that represents the bit value of each bit of the corresponding constant-value bit-plane, the bit value of each bit of the corresponding constant-value bit-plane being a zero value when the bit value of the value mask is a first value, the bit value of each bit of the corresponding constant-value bit-plane being a one value when the bit value of the value mask is a second value,
    wherein the bit value is established as irrelevant in response to the indicator mask failing to identify that the bit-plane is a constant-value bit-plane; and
    logic accessing memory storing the block of pixels to process the binary data of each mixed-value bit-plane and accessing memory storing the encoding to process the binary data of each constant-value bit-plane when a processing operation is performed on the block of pixels.

2. The graphics processor of claim 1, wherein the memory storing the block of pixels is a Z buffer and the binary data of the block of pixels corresponds to Z values of the pixels.

3. The graphics processor of claim 1, further comprising logic constructing the binary data of each constant-value bit-plane from the indicator and value masks associated with the block of pixels.

4. The graphics processor of claim 1, further comprising logic determining a minimum possible value and a maximum possible value for the binary data of the block of pixels based on the indicator mask and the value mask.

5. The graphics processor of claim 4, further comprising:
    a test module receiving a tile of pixels associated with a primitive being processed; and
    logic comparing minimum and maximum values of binary data in the tile of pixels with the minimum possible value and the maximum possible value determined from the masks to determine whether that tile of pixels may be drawn in its entirety.

6. The graphics processor of claim 4, further comprising logic determining the minimum possible value for the binary data of the block of pixels from the value mask and determining the maximum possible value for the binary data of the block of pixels from a sum of the value mask and a bit negation of the indicator mask.

7. The graphics processor of claim 1, wherein the encoding includes:
    a base value corresponding to a minimum value for the binary data of the block of pixels; and
    a range value corresponding a range of values for the binary data of the block of pixels.

8. The graphics processor of claim 1, further comprising logic determining a minimum value for the binary data of the block of pixels, and logic subtracting the determined minimum value from the binary data of each pixel in the block before the binary data of the block of pixels are grouped into bit-planes.

9. The graphics processor of claim 1, further comprising logic computing a range of values from the binary data of the block of pixels, the range of values providing an indication of which one or more of the bit-planes is a constant-value bit-plane and which one or more of the bit-planes is a mixed-value bit-plane, the range of value produced from a minimum possible value and a maximum possible value for the binary data of the block of pixels; and
    wherein the encoding comprises the computed range, and each bit position in the computed range that is at a higher bit position than the most significant bit position having a bit value equal to 1 corresponds to a constant-value bit-plane.

10. The graphics processor of claim 1, further comprising:
    memory storing an encoding for each block of pixels, each encoding indicating which bit-planes are constant-value bit-planes having binary data comprised of a same bit value from every pixel in that block of pixels and which bit-planes are mixed-value bit-planes in that block of pixels; and logic performing a fast clear operation of each block of pixels by setting the encoding for each block of pixels to indicate that every bit-plane for that block of pixels is a constant-value bit-plane and that every constant-value bit-plane has a value equal to a reset value.

11. A method of reducing memory bandwidth consumption, the method comprising:

grouping binary data of a block of pixels into a plurality of bit-planes, each bit-plane corresponding to a different bit position in the binary data of the block of pixels and including a bit value from each pixel in the block at that corresponding bit position;

associating an encoding with the block of pixels that represents which one or more of the bit-planes is a constant-value bit-plane having binary data comprised of a same bit value from every pixel in the block and which one or more of the bit-planes is a mixed-value bit-plane, wherein the encoding includes:

an indicator mask having one bit for each bit-plane of the block of pixels, each bit of the indicator mask having a bit value that indicates whether the corresponding bit-plane is a constant-value bit-plane; and a value mask having a bit for each constant-value bit-plane of the block, each bit of the value mask having a bit value that represents the bit value of each bit of the corresponding constant-value bit-plane, the bit value of each bit of the corresponding constant-value bit-plane being a zero value when the bit value of the value mask is a first value, the bit value of the bit of the corresponding constant-value bit plane being a one value when the bit value of the mask is a second value, wherein the bit value is established as irrelevant in response to the indicator mask failing to identify that the bit-plane is a constant-value bit-plane; and accessing memory storing the block of pixels to process the binary data of each mixed-value bit-plane and accessing memory storing the encoding to process the binary data of each constant-value bit-plane, when performing a processing operation on the block of pixels.

12. The method of claim 11, wherein the memory storing the block of pixels is a Z buffer and the binary data of the block of pixels corresponds to Z values of the pixels.

13. The method of claim 11, further comprising constructing the binary data of each constant-value bit-plane from the indicator and value masks associated with the block of pixels.

14. The method of claim 11, further comprising determining a minimum possible value and a maximum possible value for the binary data of the block of pixels based on the indicator mask and the value mask.

15. The method of claim 14, further comprising:

receiving a tile of pixels associated with a primitive being processed; and comparing minimum and maximum values of binary data in the tile of pixels with the minimum possible value and the maximum possible value determined from the masks to determine whether that tile of pixels may be drawn in its entirety.

16. The method of claim 14, further comprising determining the minimum possible value for the binary data of the block of pixels from the value mask and determining the maximum possible value for the binary data of the block of pixels from a sum of the value mask and a bit negation of the indicator mask.

17. The method of claim 11, wherein the encoding includes:

a base value corresponding to a minimum value for the binary data of the block of pixels; and a range value corresponding a range of values for the binary data of the block of pixels.

18. The method of claim 11, further comprising determining a minimum value for the binary data of the block of pixels, and subtracting the determined minimum value from the binary data of each pixel in the block before grouping the binary data of the block of pixels into bit-planes.

19. The method of claim 11, further comprising computing a range of values from the binary data of the block of pixels, the range of values providing an indication of which one or more of the bit-planes is a constant-value bit-plane and which one or more of the bit-planes is a mixed-value bit-plane, the range of value produced from a minimum possible value and a maximum possible value for the binary data of the block of pixels; and wherein the encoding comprises the computed range, and each bit position in the computed range that is at a higher bit position than the most significant bit position having a bit value equal to 1 corresponds to a constant-value bit-plane.

20. The method of claim 11, further comprising:

storing an encoding for each block of pixels, each encoding indicating which bit-planes are constant-value bit-planes having binary data comprised of a same bit value from every pixel in that block of pixels and which bit-planes are mixed-value bit-planes in that block of pixels; and performing a fast clear operation by setting the encoding for each block of pixels to indicate that every bit-plane for that block of pixels is a constant-value bit-plane and that every constant-value bit-plane has a value equal to a reset value.

21. A video graphics system comprising:

a graphics processor including:

logic grouping binary data of a block of pixels into a plurality of bit-planes, each bit-plane corresponding to a different bit position in the binary data of the block of pixels and including a bit value from each pixel in the block at that corresponding bit position;

an encoding, associated with the block of pixels, that represents which one or more of the bit-planes is a constant-value bit-plane having binary data comprised of a same bit value from every pixel in the block and which one or more of the bit-planes is a mixed-value bit-plane, wherein the encoding includes:

an indicator mask having one bit for each bit-plane of the block of pixels, each bit of the indicator mask having a bit value that indicates whether the corresponding bit-plane is a constant-value bit-plane; and a value mask having a bit for each constant-value bit-plane of the block, each bit of the value mask having a bit value that represents the bit value of each bit of the corresponding constant-value bit-plane, the bit value of each bit of the corresponding constant-value bit-plane being a zero value when the bit value of the value mask is a first value, the bit value of each bit of the corresponding constant-value bit-plane being a one value when the bit value of the value mask is a second value, wherein the bit value is established as irrelevant in response to the indicator mask failing to identify that the bit-plane is a constant-value bit-plane; and logic accessing the binary data of each mixed-value bit-plane and accessing the encoding for constructing the binary data of each constant-value bit-plane when a processing operation is performed on the block of pixels.

* * * * *